Patented June 9, 1931

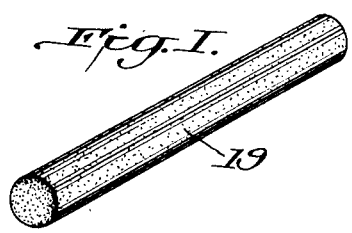
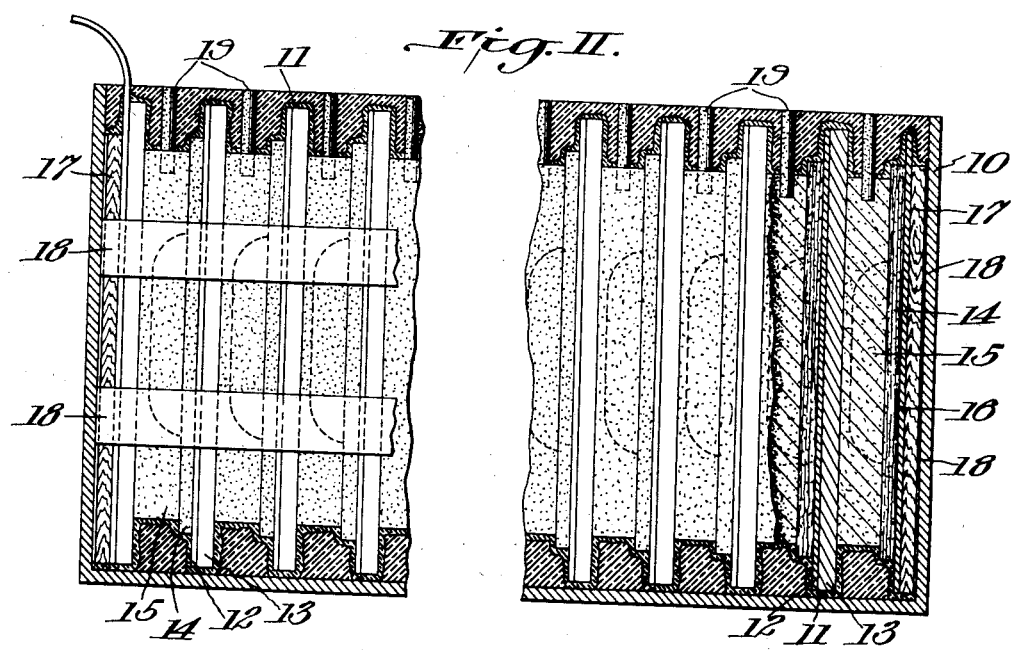

1,809,471

UNITED STATES PATENT OFFICE

NEWCOMB K. CHANEY, OF LAKEWOOD, OHIO, ASSIGNOR TO NATIONAL CARBON COMPANY, INC., A CORPORATION OF NEW YORK

DRY CELL BATTERY

Application filed February 10, 1927. Serial No. 167,251.

This invention relates to dry cells of the flat type such as may be assembled into batteries for use for various purposes, for example in the plate circuits of electron tubes used in radio communication.

A principal object of the invention is to provide improved means for venting gases generated within the cell. Other objects will appear as the description proceeds.

Paul M. Buhrer, in his co-pending application, Serial No. 167,254 filed Feb. 10, 1927 has disclosed the use as inserts for establishing capillary venting passages through the seal of a dry cell of various fibrous and porous materials. The object of these inserts is to permit the gases which are generated within the cell to escape before destructive pressures are created while minimizing diffusion of air and moisture therethrough under any ordinary changes of atmospheric pressure. I have found that certain nonfibrous materials possess the necessary degree of porosity for the foregoing purpose or may be so treated as to obtain such porosity. Examples of such materials are various plastic, organic and inorganic materials such as unglazed ceramic materials (e. g., unglazed crockery), plaster of Paris and similar cements which may be molded into desired predetermined shapes. Another and preferred material for use as venting means in cells of this type is carbon of the kind that is used in forming the carbon rod electrodes of flash light and similar cells of the cylindrical type. These materials are molded into the form of rods or other suitable bodies and the latter are inserted in the battery seal in the manner to be described.

The invention will be described in more detail in connection with the accompanying drawings, in which Fig. I is a perspective view of a carbon rod adapted to be used as venting means in dry cells of the flat type.

Fig. II is a view partly in section and partly in side elevation through a flat dry cell battery showing the relation of the venting means to the other elements of the battery.

In Fig. II, 10 is a battery box of suitable insulating material. Within the box are shown a plurality of flat type cell units each comprising a duplex electrode 11, consisting of a zinc or other suitable metal plate 12 coated on one side with a conductive carbon-containing coating 13, a bibulous spacer 14 and a depolarizing mix cake 15. The completed cell assembly also includes a plain, uncoated zinc plate 16 as one end electrode of the battery. The assembly illustrated in Fig. II also includes wooden end boards 17 and the whole assembly is held under compression by means of bands of tape 18. While the battery may be assembled in various ways and this forms no part of the present invention, a preferable method of assembling the battery is that disclosed and claimed in a copending application of Elmer J. Strohl and Edward C. Smith, Serial No. 196,907 filed June 6, 1927.

The venting of the individual cell units is accomplished by embedding one end of a carbon rod insert 19 in the peripheral portion of each of the mix cakes 15 while permitting the remainder of the insert to project upward to a point at least flush with the edge of the battery box so that upon completion of the sealing operation the upper ends of the carbon rod inserts will be freely exposed to the atmosphere.

The carbon rod inserts are preferably prepared from carbon of the kind and quality customarily used in making the carbon rod electrodes of cylindrical cells such as are used in flash lights and for other similar purposes and the method and means for forming such electrodes may be employed in preparing inserts for use in carrying out the present invention. If desired the porous inserts may be so treated as to render them substantially impervious to water. In doing this the gas-conducting properties of the material must of course not be destroyed. Procedure adapted for this purpose comprises impregnating the insert with a mixture of lubricating oil, 10%, and carbon tetrachlorid, benzol or similar volatile solvents, 90%. This is followed by a heat treatment to evaporate the solvent.

The venting capacity of the inserts is controlled within certain predetermined limits.

These vary in accordance with the size and other characteristics of the cell. A test which has proven suitable in standardizing such inserts, consists in passing such an insert through a partition or other medium which is otherwise impermeable to gases. A vacuum is then created on one side of the partition and the rate of flow of air through such insert is measured. For venting flat type cells of the size used in radio "B" batteries now on the market suitable inserts pass air at rates from 0.15 to 1.5 cc. per minute, through a length equivalent to their operating path in the cell, under a vacuum of 61 millimeters of mercury.

The non-fibrous, porous materials above mentioned possess the advantage as compared with fibrous materials such as wood, fabric, etc., that the porosity can be better controlled and greater uniformity is assured. Also the ability of the non-porous materials above mentioned to be molded into units of standardized size and the rigidity of such molded inserts permits of the more ready manipulation of them so that their application to dry cell batteries may be brought about by machine rather than hand operations. Another advantage lies in the fact that such materials are either non-inflammable or ignite only at relatively high temperatures as compared with wood or paper. Consequently, the possibility of the destruction or damage of such inserts during the torching operations incident to the sealing of the battery is eliminated.

I claim:

1. A dry cell battery comprising a plurality of flat electrode elements arranged in spaced relation, depolarizer mix in the inter-electrode spaces and spaced from certain of said electrodes by bibulous spacing members, plastic sealing material completely encasing the cell assembly thus formed and a plurality of non-fibrous carbonaceous elements extending through the sealing material and embedded in the depolarizer mix in the respective inter-electrode spaces and establishing between the respective cells and the atmosphere capillary passages of such size and number as to insure adequate venting under various conditions of use while minimizing the transfer of gases and moisture by diffusion.

2. A dry cell battery comprising a plurality of flat electrodes, arranged in spaced relation, depolarizer mix in the inter-electrode spaces and spaced from certain of such electrodes by bibulous spacing members, plastic sealing material of insufficient permeability to vent gases completely encasing the cell assembly thus formed and preformed porous carbon inserts extending through the sealing material and embedded in the depolarizer mix in the respective inter-electrode spaces, and establishing between the respective cells and the atmosphere capillary passages of such size and number as to insure adequate venting under various conditions of use while minimizing the transfer of gases and moisture by diffusion.

3. In a flat type dry cell battery having a moist depolarizing mix; a carbon electrode in contact with said depolarizer mix; a casing of gas and liquid impervious material enclosing the mix and electrode; one or more vents of gas pervious, water repellant, carbon rods extending through said casing and into the mix of each cell, each vent having promiscuously arranged gas passages, forming an outlet for the gas at all points of gas contact on the vent.

In testimony whereof, I affix my signature.

NEWCOMB K. CHANEY.